Sept. 2, 1947.  R. SIMPSON  2,426,713
ILLUMINATED INSTRUMENT
Filed March 31, 1945  2 Sheets-Sheet 1
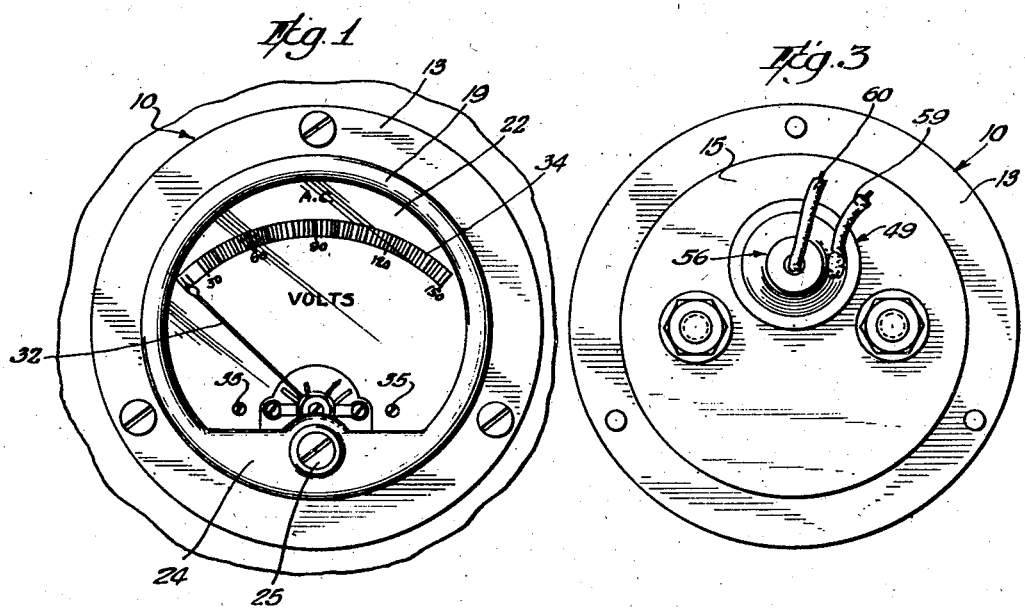
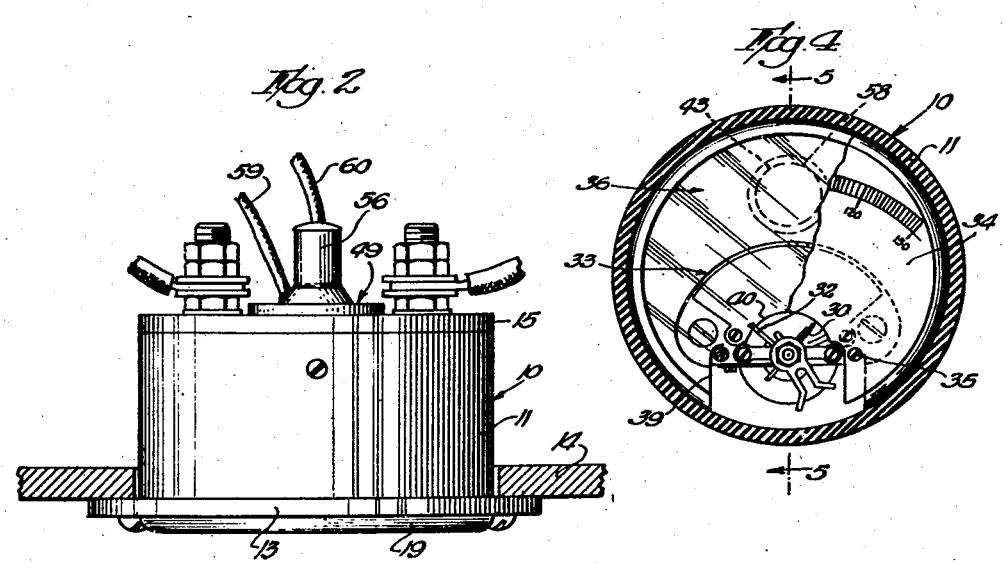
Inventor:
Ray Simpson
By: McCaleb, Nehrlt & Dickinson
Attys.

Sept. 2, 1947. R. SIMPSON 2,426,713
ILLUMINATED INSTRUMENT
Filed March 31, 1945 2 Sheets-Sheet 2

Inventor:
Ray Simpson
By McCaleb, Wenkt & Dickinson
Attys.

Patented Sept. 2, 1947

2,426,713

UNITED STATES PATENT OFFICE 2,426,713

ILLUMINATED INSTRUMENT

Ray Simpson, River Forest, Ill.

Application March 31, 1945, Serial No. 585,889

1 Claim. (Cl. 240—2.1)

The present invention relates to illuminated instruments, and is particularly concerned with the illumination of various kinds of instruments employing a dial and a pointer or other similar indicating means, such as, for example, electrical measuring instruments.

The present application relates to improvements over my prior application, Ser. No. 520,787, filed February 2, 1944, for Illuminated Instruments.

One of the objects of the present invention is the provision of an improved and simplified structure for illuminated instruments by means of which the electric bulb which furnishes the illumination may be housed within the electrical instrument housing and by means of which the entire assembly may be simplified and made capable of more economical manufacture without sacrificing any of the desirable results attained in my prior invention.

Another object of the invention is the provision of an improved illuminated instrument in which the dial is more uniformly and adequately illuminated than with the devices of the prior art.

Another object of the invention is the provision of an improved arrangement for housing and supporting the illuminating bulb in such manner that it does not increase the bulk of the instrument housing overall, but also in such manner that the bulb is heat insulated from the movement of the electrical measuring instrument so that errors will not be introduced into the reading of the instrument by the heat generated by the electrical bulb which is used as a light source.

Another object of the invention is the provision of an illuminated instrument in which the source of illumination is disposed backwardly of an opaque dial plate and in which the light is uniformly and symmetrically conducted to all parts of the dial which require illumination so as to eliminate shadows on the dial or any errors due to imperfect illumination.

Another object of the invention is the provision of an improved illuminated electrical instrument structure which is sturdy, capable of economical manufacture, simple, and adapted to be easily assembled and used for a long period of time without necessity for repair or replacement of the illuminating structure.

Another object of the invention is the provision of an improved illuminating structure for instruments which is adapted to effect a much more uniform illumination of the dial or pointer or other structures to be illuminated, with the use of a minimum light.

Other objects and advantages of the invention will be apparent from the following description and the accompanying drawings, in which similar characters of reference indicate similar parts throughout the several views.

Referring to the drawings, of which there are two sheets,

Fig. 1 is a front elevational view of an instrument embodying my invention, secured to a panel;

Fig. 2 is a top plan view of the same instrument, with the panel in section;

Fig. 3 is a rear elevational view of the instrument removed from the panel;

Fig. 4 is a sectional view, taken on the plane of the line 4—4 of Fig. 5;

Figure 5:
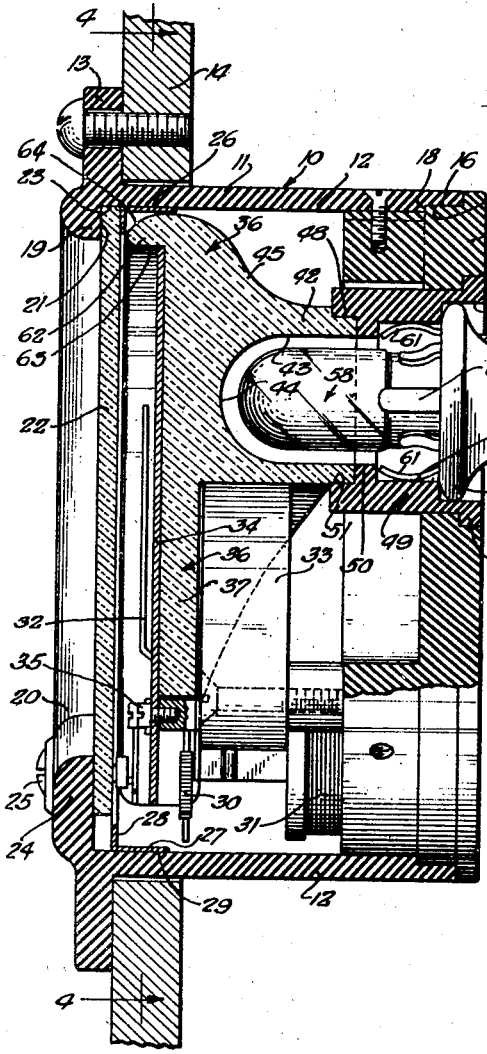
Fig. 5 is an enlarged vertical sectional view, taken on the plane of the line 5—5 of Fig. 4, looking in the direction of the arrows.

Referring to Figs. 1 to 5, 10 indicates in its entirety the illuminated electrical instrument, preferably enclosed in a housing 11, which may be made of any suitable material. For example, the housing may consist of a cylindrical member 11, the cylindrical wall 12 of which may be constructed of insulation, such as a molded phenolic condensation product having a radially extending face flange 13 for engaging the outside of a panel 14.

The back of the instrument is closed by an insulating back wall 15 of similar material, which is circular in shape and provided at its edge with a cylindrical surface 16 fitting in a cylindrical bore 17 against an annular shoulder 18 carried by the side wall 12.

The front of the instrument may be provided with an inwardly projecting flange 19 having a curved outer surface 20 and a flat inner annular shoulder 21 for engaging the glass 22 or other transparent member which encloses the front or face of the instrument.

The opening 23, which is closed by the glass 22, may be substantially circular, except at the lower side, where a portion 24 of the housing extends across the face for supporting the adjustment screw 25.

The transparent member 22 of glass or suitable plastic is preferably held in place by engagement of its face with the shoulder 21 and engagement of its rear side by means of a bezel ring 26. The bezel ring 26 may consist of a suitable metal member, preferably made of nonmagnetic metal, such as brass, having a cylindrical flange 27 and a plane annular flange 28.

The cylindrical flange 27 has a frictional fit against the inner cylindrical surface 29 of the side wall 12, and the annular flange 28 engages the rear side of the transparent member 22 and holds it against the shoulder 21.

The present illuminating structure may be used with various types of instruments, but is peculiarly adapted to be used with instruments having a relatively small movement and a relatively large dial, such as, for example, a voltmeter of the moving vane type, which is illustrated.

This instrument has a suitable moving element 30, with a depending vane mounted for movement within a coil 31. The moving element has a pointer 32 and is rotatably supported upon a suitable frame 33 having a housing with a damping vane (not shown). The opaque dial plate 34 is supported upon the frame 33 by a plurality of screw bolts 35, and the illumination conducting member 36 is confined between the frame 33 and the dial plate 34 by having a plate-like portion 37 extend over and between the frame 33 and the dial plate 34.

This plate-like portion is provided with a circular inner boundary 38 and is formed adjacent a rectangular cut-out 39, which also has a partially circular cut-out 40 for accommodating the movement and the upwardly projecting portion of the needle.

The illuminating member 37 is preferably made of some suitable transparent plastic, such as one which is available under the trade name "Lucite," and the light conducting plastic is preferably one selected from the point of view of its ability to conduct light with a minimum loss of light.

In some embodiments of the invention the light conducting member may be made of quartz or glass.

Figure 6:
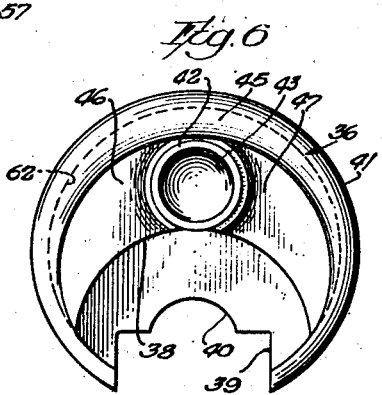
Fig. 6 is a rear elevational view of the light conducting member.
Figure 7:
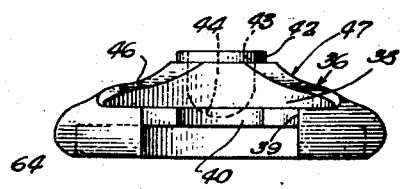
Fig. 7 is a top plan view of the light conducting member.

Referring to Fig. 6, the light conducting member tapers in thickness from its outer edge 41 toward a rearwardly projecting circular lug 42, which is located eccentrically of the circular boundary 41 for the purpose of accommodating both the source of illumination and the movement.

The rearwardly projecting lug 42 in the illuminating member 36 has a centrally located substantially cylindrical socket 43, which terminates in a partially spherical end wall 44. At 45 the side wall of the illumination conducting member 36 curves inwardly to the tapering rearwardly projecting lug 42. At 46 and 47 on either side of this lug the illumination conducting member 36 slopes upwardly toward the end of the lug 42. At 38 there is an abrupt partially cylindrical wall corresponding to the shape of the movement frame 33.

The length of the rearwardly projecting lug 42 is such that it is entirely within the housing 11, and this lug is preferably provided with a reduced cylindrical portion 48 for engagement with a heat insulating member 49. This heat insulating member may be made of any suitable material, such as hard rubber; and it comprises an insulating nonmetallic sleeve having an inwardly extending annular flange 50 for engaging the end of lug 42.

It also has an inward bore 51 for receiving the end of the lug 42. At its opposite end this sleeve 49 has a bore 52 and a counterbore 53 and a radially extending flange 54. The counterbore 53 is for receiving the radially projecting body portion 55 of a bulb socket member 56, which has an outwardly projecting cylindrical body 57 that may be grasped by the fingers.

The socket member 56 may be of any standard type, such as the bayonet slot type, for receiving a bulb 58 and effecting connection between the filament of said bulb and the conductors 59, 60. The socket member 56 also has a plurality of curved spring fingers 61, which engage in the bore 52 and hold the socket member and its bulb in this bore.

The bulb then projects into the cylindrical socket 43 of the illumination conducting member 36, and the spherical end wall 44 of this socket is substantially concentric to the end of the bulb. The front end of the illumination conducting member 36 has an axially projecting flange 62, the inner cylindrical wall 63 of which engages the edge of the dial plate 34 and projects axially beyond and in front of the dial plate.

The flange 62 extends substantially about the periphery of the dial plate, terminating at the cut-out 39, at the lower portion of the dial plate, where illumination is not required.

The inside of the socket 43 and end wall 44 may be suitably ground to produce a ground glass finish for diffusing and distributing the light from the bulb 58 more uniformly.

The operation of the present illuminated instrument is as follows: The bulb 58 is substantially insulated from the movement of the instrument by being surrounded by the insulating sleeve 49 and the rearwardly extending lug 42 of the illumination conducting member 36. Light from the bulb 58 enters the illumination conducting member at the walls 43 and 44 and is carried forwardly into the body of this member and radially through the body and the plate portion 37 to the cylindrical border flange 62.

The external rear surface of the illumination conducting member 36 is preferably a smooth and polished glass-like surface, such as naturally results from the molding of such a plastic member. This external surface reflects light inwardly, and it increases the illumination available at the cylindrical edge 63.

The external edge portion of the flange 62 is indicated by the numeral 64, and it is preferably curved inwardly so that the center of this curvature is located at the face of the dial plate 34. Thus this reflecting surface 64 tends to reflect light inwardly toward the dial plate 34.

The illumination passes outwardly of the member 36 at the wall 63 surrounding the face of the dial plate, and thus tends to illuminate the dial plate quite uniformly.

It will thus be observed that I have invented an improved illuminated instrument in which the source of illumination is housed within the instrument housing, but is substantially heat insulated from the movement and in which illumination is conducted substantially uniformly to all indicating parts of the dial.

The present structure involves the use of a lesser amount of the light conducting material than that of my prior application. It is more compact, and its illumination is substantially as effective as that of my prior invention. The source of illumination is also supported directly by the instrument housing and housed thereby, and it is readily renewable by merely withdrawing the socket and changing the bulb.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In an illuminated electrical instrument, the combination of a supporting housing comprising a substantially cylindrical member formed on its forward end with a circular opening bordered by an inwardly extending flange, a circular transparent window member located in said opening against said flange, a circular bezel member having a cylindrical flange engaging frictionally on the inside of said housing and having a radial flange engaging said transparent window member, a back plate forming a supporting base for a meter movement and adapted to fit in the open rear end of said housing, said back plate having its movement provided with a dial, a light transmitting member of substantially circular form provided around the major portion of its periphery with a forwardly extending cylindrical light transmitting flange, said light transmitting member having a flat forward surface engaging the rear side of the dial and having a rearwardly extending cylindrical portion engaging inside a cylindrical insulating plug carried by the base plate, said plug and rearwardly extending cylindrical portion of the light transmitting member being provided with registering bores, and the bore in said light transmitting member terminating in a partially spherical end surface, a bulb supporting socket provided with spring fingers for frictional engagement in a bore in said plug, said socket supporting an electric bulb having its transparent envelope of a shape substantially complementary to the socket in said light transmitting member, whereby the illumination from said bulb is transmitted to the front of said dial plate by said forwardly extending flange and distributed substantially uniformly over that portion of the dial having indicia.

RAY SIMPSON.

REFERENCES CITED

The following references are of record in the file of this patent:

UNITED STATES PATENTS

| Number | Name | Date |
|---|---|---|
| 2,195,423 | Powell | Apr. 2, 1940 |
| 2,242,536 | Montgomery | May 20, 1941 |
| 2,290,278 | Failla | July 21, 1942 |
| 1,762,383 | Booraem | June 10, 1930 |
| 2,211,118 | Hills | Aug. 13, 1940 |
| 2,214,595 | Rights | Sept. 10, 1940 |
| 2,317,182 | Dickson et al. | Apr. 20, 1943 |
| 2,413,848 | Simpson | Jan. 7, 1947 |

FOREIGN PATENTS

| Number | Country | Date |
|---|---|---|
| 129,736 | Great Britain | July 24, 1919 |
| 396,807 | Germany | June 26, 1924 |
| 544,886 | Great Britain | May 1, 1942 |
| 298,212 | Great Britain | 1930 |
| 813,186 | France | Feb. 22, 1937 |